March 2, 1954 A. CLARKSON 2,670,723
SHOT BLAST CLEANER FOR COIL TYPE STEAM GENERATORS
Filed March 1, 1951
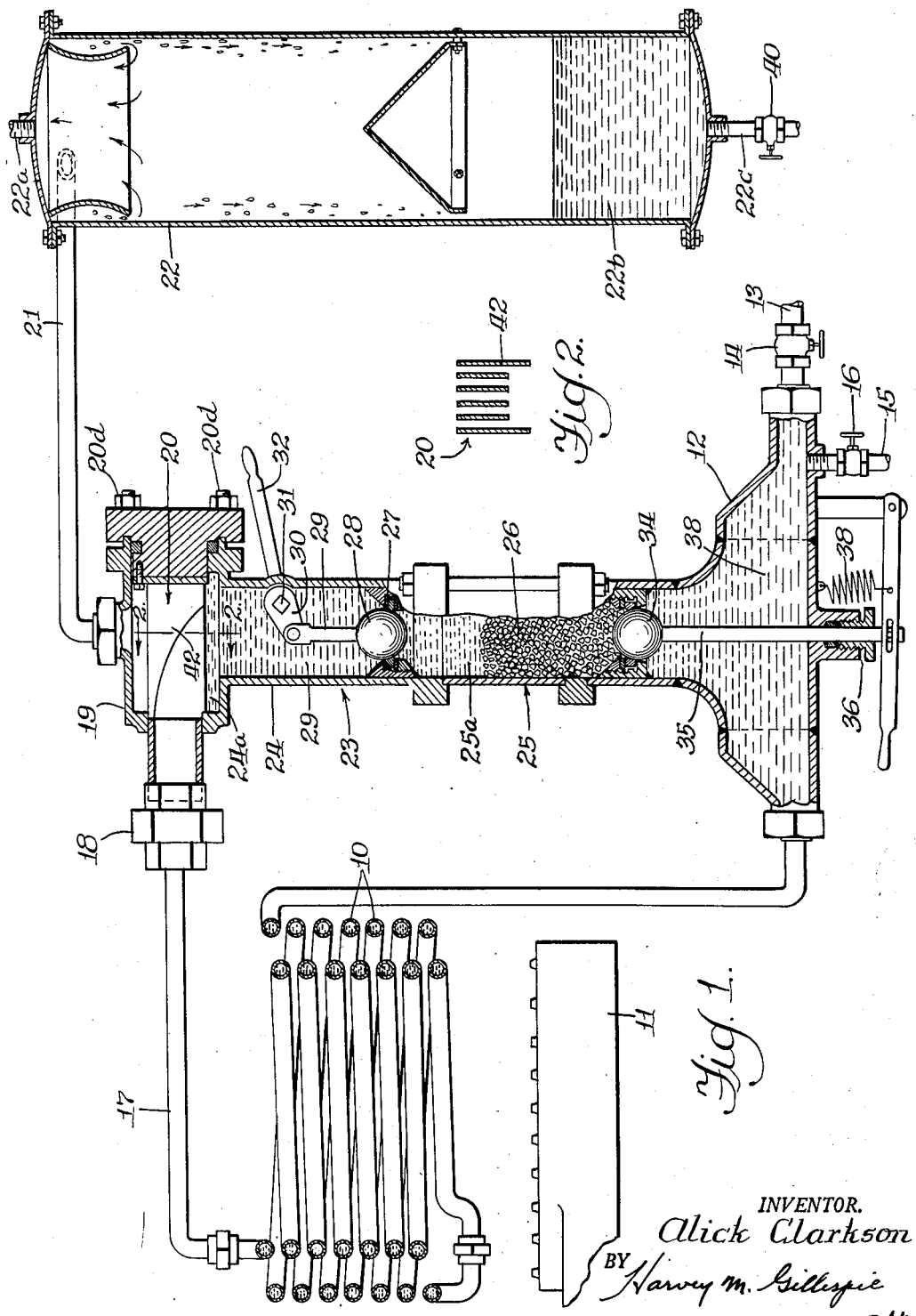
INVENTOR.
Alick Clarkson
BY Harvey M. Gillespie
Atty.

Patented Mar. 2, 1954

2,670,723

UNITED STATES PATENT OFFICE 2,670,723

SHOT BLAST CLEANER FOR COIL TYPE STEAM GENERATORS

Alick Clarkson, Paul's Spur, Ariz., assignor of one-half to Vapor Heating Corporation, Chicago, Ill., a corporation of Delaware Application March 1, 1951, Serial No. 213,421

2 Claims. (Cl. 122—379)

This invention relates to water heaters and steam generators of the general type in which the water to be heated or converted into steam is passed through one or more banks or coils of tubing positioned to receive heat from a fire chamber. The invention deals particularly with the problem of removing mineral deposits which accumulate in the boiler tubes in the form of scale and sludge.

The water which is ordinarily available for use in boilers and steam generators usually contain minerals in solution and these minerals, upon conversion of the water into steam, adhere to the inner surfaces of the boiler tubes in the form of scale. In order to maintain efficient operation of such boiler or steam generator, it is necessary to remove these mineral deposits from time to time.

In some situations the water is pretreated with chemicals to coagulate the materials therein and the minerals, or at least a part of them, are removed from the water before it is delivered into the boiler. While this pretreatment of the water removes a portion of the minerals, it does not remove all of them. Consequently, the residual minerals collect in the tubes of the boiler and form scale. Furthermore, the pretreatment of the water ordinarily requires a large amount of equipment which, in most situations, renders the pretreatment method impractical. It is, therefore, customary, in most situations, to introduce water treatment chemicals into the boiler along with the feed water, the said chemicals being intended to minimize the forming of scale by maintaining the mineral deposits in the form of a sludge which can be flushed out of the boiler tubes. The difficulty with this method is that the chemicals ordinarily used do not react with all of the minerals in the water and the heat applied to the tubing of the boiler tends to solidify and harden the accumulated sludge in such manner that it can not be flushed out of the boiler by washing. Consequently, the removal of the accumulated sludge and the hardened scale from the tubes by the usual washing of the coils with mineral solvents and by the use of mechanical means, involves shut-down of the boiler or steam generator for substantial duration of time. If the boiler installation is in a location in which the water is heavily laden with minerals, for example, if the water contains high percentages of lime, iron, or salt, the shut-downs of the boiler for purpose of cleaning are so frequent as to make it uneconomical to use a water tube boiler in such locations.

A principal object of the present invention is to provide an improved apparatus for removing the scale and mineral sludge from boilers and steam generators of the above general class, whereby said sludge and scale can be removed from time to time without materially interfering with the normal operations of the boiler or steam generator.

According to the present invention, a quantity of abrasives, preferably in the form of small pellets, are introduced into the boiler tubes with the feed water so that the pellets are carried by the water pressure through the tubing of the boiler, and thereby dislodge any accumulation of minerals in the form of scales before such accumulation becomes hardened in a manner to restrict the area of the tube. The pellets or other abrasives used are screened out of the fluid discharged from the boiler and returned to a receptacle in readiness to be again passed through the boiler tubing at will. The mineral scale and sludge removed from the boiled is carried by the mixture of water and steam into a steam separator from which the sludge and scale may be discharged from the system.

The invention can best be described and explained by reference to the accompanying drawing, wherein:

Fig. 1 illustrates, somewhat schematically, a preferred embodiment, as applied to a water tube boiler adapted for use either as a hot water heater or a steam generator; and Fig. 2 is an enlarged section taken at line 2—2 of Fig. 1, showing a detail of construction.

A water heating unit consisting of a coil of tubing 10 is disposed in heat-receiving relation to a source of heat, for example a burner 11, and is connected at its inlet end to the interior of a hollow fitting 12 forming a continuation of a feed water supply conduit 13 having a shut-off valve 14; the said pipe 13 leading from a conventional water feed pump not shown. A pipe 15 having a shut-off valve 16 may, if desired, be provided for connection to a source of water other than from the feed pump so that water may be delivered under pressure into said coil when the feed pump is not being operated.

The outlet end of the coil 10 is connected through a discharge conduit 17 and coupling 18 to a special fitting 19 in which is mounted a pellet deflector in the form of a screen or grating 20 which screens out the pellets or other abrasives from the water or mixture of water and steam discharged from the coil 10, but allows free passage of hot water and steam into the discharge conduit 21 leading to a steam separator 22. The steam separator 22 is of conventional construction and is adapted to separate the steam from the water discharged from the coil 10. The steam rises into the upper end of the separator and is discharged therefrom through steam discharge pipe 22ª. The water accumulates in the lower end 22ª of the separator 22 and may be discharged therefrom through a valved outlet pipe 22ᶜ. When the water collected in the steam separator does not contain appreciated scale or mineral sludge it may be utilized, in the known conventional manner, as makeup water for the boiler, but if it is heavily laden with mineral scale or sludge it may be disposed of in any suitable manner.

Shunted between the fittings 12 and 19 is a bypass 23 including a branch conduit 24, an upper chamber 24ª and a section 25 defining a lower chamber 25ª. Both chambers are designed to receive a quantity of pellets 26, the chamber 24ª receiving the pellets as they are discharged from the outlet pipe 27 and the chamber 25ª holds the charge of pellets in a position to be reintroduced into the coil 10 of the boiler. The said pellets are preferably in the form of small bits of hardened steel having sharp or abrasive edges, which may conveniently be cut from high carbon steel rods of any desired cross-section. However, the invention contemplates any form of abrasive which may be used effectively to break up the hardened mineral deposits in the tubing 10 and I do not intend to limit the scope of my invention in mentioning a particular form or type of abrasive.

The abrasive pellets are delivered from the upper chamber 24ª into the lower chamber 25ª through a valved opening 27. A valve seat of general funnel configuration defines said opening 27 and cooperates with a ball closure or valve 28 to close the opening 27. The ball 28 is suspended on a link 29 pivotally connected at its upper end to a short lever arm 30 secured to a shaft 31 which is provided with a manually operable lever arm 32.

The lower end of container 25 has a discharge opening provided with a valve seat of funnel configuration against which normally rests a ball closure member or valve 34 which is attached to the upper end of a valve stem 35, the lower end of which passes through a packing gland 36 and is connected to an operating lever 37. A coil spring 38 biases the valve stem 35 upwardly and serves to hold the ball 34 on its seat until displaced by manual operation of lever 37.

At intervals dictated by scaling conditions, the operator manipulates the lever 37 to lower the ball 34, thus allowing the charge of pellets 26, or a portion thereof, to drop into the fitting 12, which forms a part of the feed water supply conduit. The charge of pellets are immediately propelled with great force through the coil 10 by the pressure and velocity of the feed water delivered through pipe 13. The charge of pellets in their movement through the water coil 10, performs scouring action on the inner surfaces of the coil and thereby removes all particles of mineral sludge and scale which may be adhering to the inner surface of the coil. The sludge and dislodged scale are carried into the steam separating chamber 22 by the mixture of water and steam discharged from the coil, but the pellets 26 are intercepted by the screen or grating 20, which deflects them downwardly into the receiving chamber 24ª. The charge of pellets 26 are retained in the receiving chamber 24ª, since the valve 28 is normally closed during the blast or movement of the pellets through the tube 10. After all pellets have passed from the coil 10 into the receiving chamber 24ª, they may be transferred from chamber 24ª into chamber 25ª by opening the valve 28 whereupon the pellets pass through said opening 27 into the lower chamber 25ª in readiness to be again passed through the coil 10. A full or partial blast of pellets may be passed through the coil 10 as often as desired or necessary to keep the coil free of sludge and scale. The passing of the pellets through the coil does not interfere with the normal use of the boiler or steam generator. Consequently, the inventor makes it practical to utilize the water tube type of boiler or steam generator.

The screen or grating 20 must be rugged to withstand for a long time the percussive and abrasive action of the shot. It may appropriately consist of a group of hardened steel plates 42 having their lower edges curved downwardly (see Fig. 2) and spaced apart laterally to a sufficient degree to allow steam, water and mineral sludge to pass freely into the separating chamber 22 but closely enough together to block passage of the pellets. The scale removed from the tubing is normally reduced to powder or fine granular form and will pass through the grating with the steam and water. The said grating 20 is preferably formed to be readily removed for purpose of repair or for replenishing the pellets 26. To this end, the several spaced apart plates are fixed to a base plate 20ª which is removably attached by bolts 20ᵇ to a closure element 20ᶜ for closing one end of the fitting 19. The closure element 20ᶜ is clamped in position by means of clamp bolts 20ᵈ.

When the equipment herein shown is utilized as a water heater in a hot water system, the steam separator chamber 22 will be entirely filled with water, but the scale and sludge carried into the chamber 22 with the water will settle to the lower portion of the tank, whereby this waste matter may be discharged from the tank 22, from time to time, by opening the valve 40.

When it is desired to flush and clean the coil 10 while the boiler is shut down, the valve 14 and the feed water pipe 13 is closed and the valve 16 is opened to deliver water into the coil from the auxiliary water pipe 15. During this flushing operation, the charge of pellets may be passed through the coil 10 as frequently as may be desired to thoroughly remove all mineral residue from the coil.

When the coils are cleaned during the normal operation of the boiler, the pellets 26 are passed through all coils of the boiler. However, it will be obvious from the disclosure in Fig. 1 that the pellets may be passed through the individual coils by directly connecting the inlet and outlet of such coil with the chamber 18 and outlet conduit 17. It will be observed also that while use of feed water is ordinarily used to propel the pellets through the coils, steam, compressed air, and other fluids other than water may be used for this purpose by connecting the conduit 13 and/or conduit 15 to suitable sources of supply.

I claim:

1. The combination with a water tube boiler or steam generating system, of means for removing scale and mineral sludge from the tubing of the boiler comprising a container for a quantity of abrasive material having a discharge opening in communication with the inlet end of said boiler tubing, a valve normally closing said discharge opening, means for delivering water under pressure into said inlet end of said tubing, whereby the water propels the abrasive material through said boiler tubing, means comprising a removable grating composed of a plurality of laterally spaced plates interposed in the discharge end of said tubing and formed with curved surfaces for engaging and deflecting the abrasive material out of the path of movement of said fluid, and means defining a receiving chamber communicating with said tubing adjacent said grating to receive the deflected abrasive material.

2. The combination with a water heating or steam generating system including a tubular heating unit having a water inlet end and an outlet end, a feed water supply conduit connected to said inlet end, a discharge conduit connected to said outlet end, a pellet-holding container located above the feed water supply conduit and having a discharge opening at its bottom leading into said feed water supply conduit, a manually operable valve normally closing said discharge opening, a pellet-receiving container communicating with said discharge conduit, deflector means located at the junction of said pellet-receiving container and said discharge conduit and operative to divert pellets away from said discharge conduit into said receiving chamber, means defining a passageway between said receiving container and said holding container, and a manually operable valve for opening and closing said passageway.

ALICK CLARKSON.

References Cited in the file of this patent

UNITED STATES PATENTS

| Number | Name | Date |
|---|---|---|
| 1,046,591 | Hickmott | Dec. 10, 1912 |
| 1,216,811 | Ingles | Feb. 20, 1917 |
| 1,642,610 | Ingles | Sept. 13, 1927 |
| 1,808,870 | Strasburg | June 9, 1931 |
| 2,011,323 | Remick | Aug. 13, 1935 |

FOREIGN PATENTS

| Number | Country | Date |
|---|---|---|
| 19,846 | Great Britain | Sept. 5, 1907 |
| 28,866 | The Netherlands | Aug. 15, 1932 |